(12) United States Patent
Graff

(10) Patent No.: US 10,645,330 B2
(45) Date of Patent: May 5, 2020

(54) VISUAL CONTROL OF A VIDEO CONFERENCE

(71) Applicant: Pexip AS, Lysaker (NO)

(72) Inventor: Håvard Graff, Oslo (NO)

(73) Assignee: Pexip AS, Lysaker (NO)

( * ) Notice: Subject to any disclaimer, the term of this patent is extended or adjusted under 35 U.S.C. 154(b) by 0 days.

(21) Appl. No.: 16/153,184

(22) Filed: Oct. 5, 2018

(65) Prior Publication Data

US 2019/0199955 A1   Jun. 27, 2019

(51) Int. Cl.
| | |
|---|---|
| H04N 5/44 | (2011.01) |
| H04N 7/15 | (2006.01) |
| G06F 3/03 | (2006.01) |
| H04N 21/47 | (2011.01) |
| H04N 7/025 | (2006.01) |
| G06F 3/01 | (2006.01) |
| G06F 3/0481 | (2013.01) |
| G06F 3/0482 | (2013.01) |
| G06F 3/16 | (2006.01) |

(52) U.S. Cl.
CPC ......... *H04N 5/4403* (2013.01); *G06F 3/0308* (2013.01); *H04N 7/025* (2013.01); *H04N 7/152* (2013.01); *H04N 21/47* (2013.01); *G06F 3/017* (2013.01); *G06F 3/0304* (2013.01); *G06F 3/0482* (2013.01); *G06F 3/04815* (2013.01); *G06F 3/167* (2013.01)

(58) Field of Classification Search
CPC combination set(s) only.
See application file for complete search history.

(56) References Cited

U.S. PATENT DOCUMENTS

| | | |
|---|---|---|
| 2003/0184645 A1 | 10/2003 | Biegelsen et al. |
| 2009/0210491 A1 | 8/2009 | Thakkar et al. |

(Continued)

FOREIGN PATENT DOCUMENTS

| | | |
|---|---|---|
| WO | 2007073423 A1 | 6/2007 |
| WO | 2017034720 A1 | 3/2017 |

OTHER PUBLICATIONS

Norwegian Search Report dated Jun. 21, 2018, for corresponding Norwegian Application No. 20172029; Filing Date: Dec. 22, 2017 consisting of 2-pages.

*Primary Examiner* — Phung-Hoang J Nguyen
(74) *Attorney, Agent, or Firm* — Christopher & Weisberg, P.A.

(57) ABSTRACT

A control unit and a method for a video conferencing system, the method performed by a control unit in a video conferencing system during an ongoing video conference, comprising a plurality of endpoints, comprising receiving at least one input media stream from at least one endpoint, detecting a first pointer event in the at least one input media stream, providing a first graphical item associated with the first pointer event, encoding the first graphical item in an output media stream, transmitting the output media stream to the at least one endpoint, detecting a second pointer event in the at least one input media stream from the at least one endpoint, and perform an action associated with the second pointer event, where one of a group consisting of a first and second pointer event includes one of a group consisting of a light signal, a gesture, and a sound signal.

19 Claims, 2 Drawing Sheets

(56) References Cited

U.S. PATENT DOCUMENTS

| | | | |
|---|---|---|---|
| 2012/0092436 A1* | 4/2012 | Pahud | G06Q 10/10 |
| | | | 348/14.02 |
| 2012/0313971 A1* | 12/2012 | Murata | H04N 21/44008 |
| | | | 345/660 |
| 2013/0083151 A1 | 4/2013 | Kim et al. | |
| 2014/0063174 A1* | 3/2014 | Junuzovic | G06Q 10/101 |
| | | | 348/14.02 |
| 2016/0077703 A1 | 3/2016 | Shi et al. | |
| 2016/0180743 A1* | 6/2016 | Ahmad | G06F 19/3418 |
| | | | 434/262 |
| 2017/0230614 A1* | 8/2017 | Chung | H04N 21/242 |
| 2017/0255265 A1* | 9/2017 | Dandamudi | H04W 4/80 |

* cited by examiner

VISUAL CONTROL OF A VIDEO CONFERENCE

CROSS-REFERENCE TO RELATED APPLICATION

This application is related to and claims priority to Norwegian Patent Application Serial No. 20172029, filed Dec. 22, 2017, entitled VISUAL CONTROL OF A VIDEO CONFERENCE, the entirety of which is incorporated herein by reference.

FIELD

The present disclosure relates to providing visual control and annotation capabilities of a Multiple Control Unit (MCU) in a video conference. In particular, a method and a control unit of a video conferencing system are disclosed. A computer program and a carrier therefor are also disclosed.

BACKGROUND

Transmission of moving pictures in real-time is employed in several applications like e.g. video conferencing, net meetings and video telephony. Video conferencing systems allow for simultaneous exchange of audio, video and data information among multiple conferencing sites. Control units, such as Multipoint Control Units (MCUs), perform switching functions to allow endpoints of multiple sites to intercommunicate in a conference.

An endpoint may be defined as any suitable device or apparatus that is configured to provide visual and audio communication to one or more participants at a conference site. For example, as FIG. 1 illustrates, a video conferencing system 100 that comprises endpoints 120 interconnected via an internet protocol (IP) network. A control unit 140 is in this example an MCU. As the skilled person will realize, the endpoints 120 may comprise a dedicated video communication terminal as well as suitably configured general purpose computers having video and audio communication hardware and software.

The control unit 140 links sites/endpoints/participants together by receiving frames of conference signals from the sites/endpoints, processing the received signals, and retransmitting the processed signals to appropriate sites/endpoints. The conference signals include audio, video, data and control information. In a switched conference, the video signal from one of the conference sites/endpoints, typically that of the loudest speaker, is broadcast to each of the sites/endpoints. In a continuous presence conference, video signals from two or more sites/endpoints are spatially mixed to form a composite video signal for viewing by conference participants at sites/endpoints. When the different video streams have been mixed together into one single video stream, the composed video stream is transmitted to the different sites/endpoints of the video conference, where each transmitted video stream preferably follows a set scheme indicating who will receive what video stream. In general, the different participants prefer to receive different video streams. The continuous presence or composite video stream is a combined picture that may include live video streams, still images, menus or other visual images from participants in the conference. Continuous presence may refer to a special kind of composite image for multi-screen video conferencing.

As exemplified in FIG. 1, in addition to traditional stationary video conferencing endpoints 120, external devices 130, such as mobile and computer devices, smartphones, tablets, personal devices and PCs, have recently entered the visual communication marketplace and are also used as video conferencing endpoints.

Furthermore, external devices 130 having touch screens have been used as annotation devices in video conferences. A user may annotate on the screen, e.g. on top of a snapshot of a presentation, moving a finger or a pen over the screen. An annotation application running on the external device captures the movements and transmits the movements over a dedicated annotation signal channel to an annotation software component of an MCU. The MCU then encodes the received annotation signal and transmits an annotated version of the presentation to all participant of the conference as encoded video streams. The external device 130 may also be provided with a remote-control application transmitting control signals to a control software component of the MCU, in order for a user to control the MCU.

Both the MCU and the external device are required to have additional non-standardized software components installed on the device. A data channel separate from the video signal is also required to transmit the annotation signal or the control signal from the external device to the MCU.

A drawback of such a scenario is that it is not possible to make annotations or control the MCU without being in possession of a device that has an annotation or control application installed thereon.

U.S. Patent Pub. No. 2009/0210491A1 discloses a method and apparatus to annotate frames with identifying information of participants in a multimedia conference event by detecting the participants in multiple input media streams.

SUMMARY

In view of the above, there is a need for an intuitive and user-friendly solution providing remote annotation and/or control capabilities in a video conference.

Hence, an object of the present disclosure is to overcome, or at least mitigate, drawbacks of prior art video conferencing systems.

This object is achieved, in a first aspect, by method performed by a control unit in a video conferencing system during an ongoing video conference, comprising a plurality of endpoints, the method comprising receiving at least one input media stream from at least one endpoint, detecting a first pointer event in the at least one input media stream, providing a first graphical item associated with the first pointer event, encoding the first graphical item in an output media stream, transmitting the output media stream to the at least one endpoint, detecting a second pointer event in the at least one input media stream from the at least one endpoint, and perform an action associated with the second pointer event, where the first or second pointer event includes at least one of a light signal, a gesture and a sound signal.

In a second aspect, there is provided a control unit for a video conferencing system, the control unit comprising input/output circuitry, a processor and a memory, said memory containing instructions executable by said processor whereby the control unit is operative, during an ongoing video conference comprising a plurality of endpoints, to receive at least one input media stream from at least one endpoint, detect a first pointer event in the at least one input media stream, provide a first graphical item associated with the first pointer event, encode the first graphical item in an output video stream, transmit the output video stream to the plurality of endpoints, detect a second pointer event in the at least one input media stream, and perform an action associated with the second pointer event, where the first or second pointer event includes at least one of a light signal, a gesture, and a sound signal.

In another aspect, there is provided a computer program comprising instructions which, when executed on at least one processor in a control unit, cause the control unit to carry out the method according to the aspect summarized above.

In another aspect, there is provided a carrier, comprising the computer program of the aspect summarized above, wherein the carrier is one of an electronic signal, an optical signal, a radio signal and a computer readable storage medium.

These further aspects provide the same effects and advantages as the first aspect.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

According to embodiments herein, at least one of the abovementioned drawbacks of the prior art are eliminated or at least mitigated.

Figure 1:
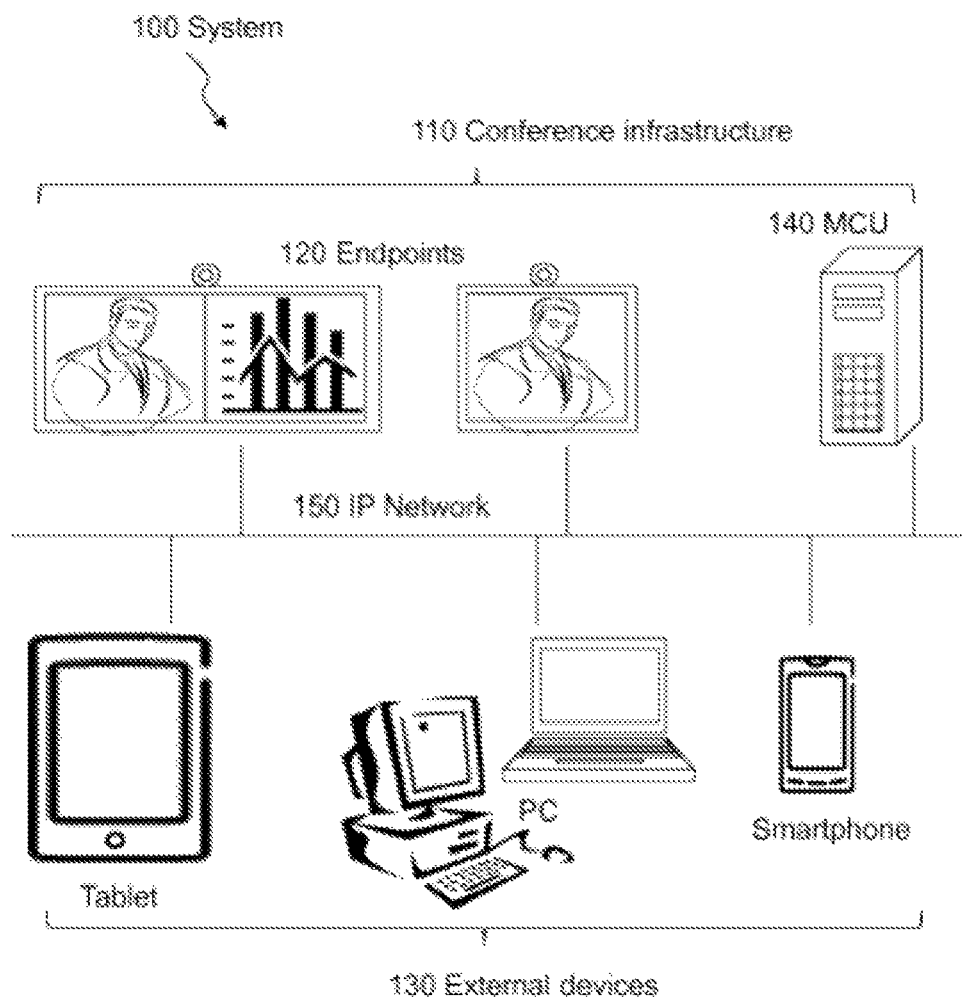
FIG. 1 schematically illustrates a video conferencing system.

FIG. 1 illustrates a videoconferencing system 100 comprising a control unit 140 and a plurality of endpoints 120, 130. The control unit 140 links the plurality of endpoints together by receiving frames of conference signals from the endpoints, processing the received signals, and retransmitting the processed signals to appropriate endpoints over an IP network 150. A user at site of one of the endpoints 120, 130 in an ongoing video conference may want to interact with video conference. The user may want to make annotations on a video stream displayed on the endpoint. The video stream may show a presentation, such as a PowerPoint, a CAD file etc., or images of participants at other sites. The user may also want to control the video conference by configuring the control unit. The user may also want to manipulate a 3D-model displayed on a video stream displayed on the endpoint.

The control unit 140 in the video conferencing system 100, during an ongoing video conference comprising a plurality of endpoints 120, 130 is receiving at least one input media stream from at least one endpoint 120, 130. To interact with the video conference, the user may perform actions that are captured by a camera at the endpoint 120, 130. The control unit 140 searches for predetermined actions in the input media streams. The predetermined actions hereinafter referred to as pointer events. The pointer event may be a hand gesture, a finger gesture, a body gesture or a light signal as will be described later. To interact with the video conference, the user may also perform actions that are captured by a microphone at the endpoint. The pointer events may include predetermined audio signals, e.g. clapping, snapping, clicking or the like.

When the control unit 140 detects a pointer event in the at least one media stream, the control unit 140 provides a graphical item associated with the pointer event. A database over pointer events and corresponding graphical items may be present in the memory of the control unit 140, or accessible for the control unit 140 on an external storage.

Figure 2:
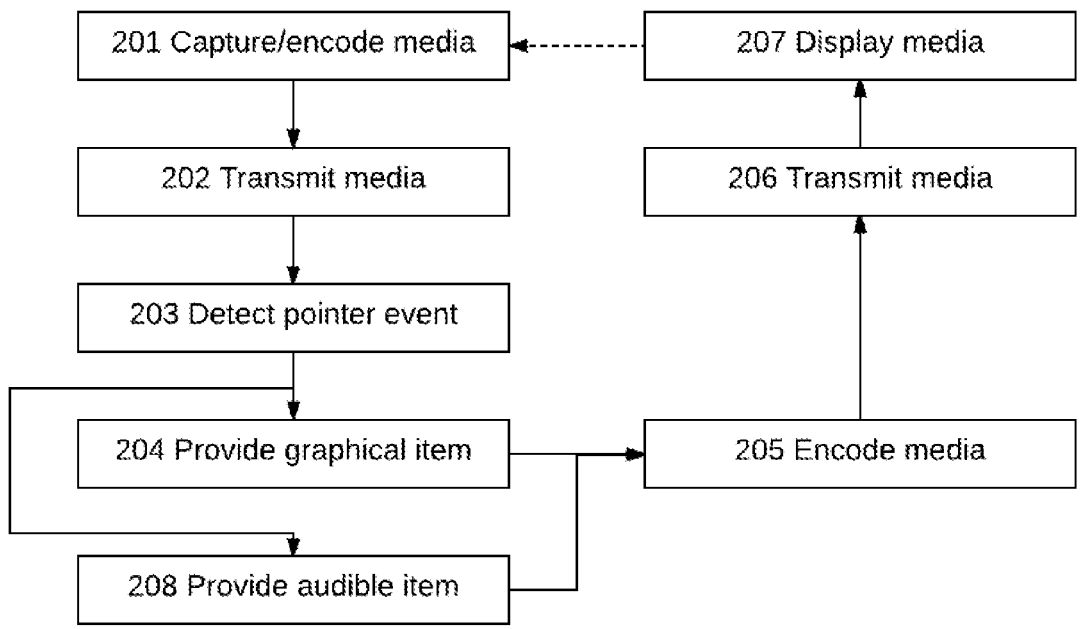
FIG. 2 is a flowchart.

An illustrative embodiment is discussed with reference to FIG. 2. In step 201, video is captured by at least one camera at the site of at least one endpoint 120, 130 and encoded in at least one video stream, e.g. using H.264, H.265, VP8, VP9, Flash video, or RTVideo. Audio may also be captured by at least on microphone at the site of the endpoint and encoded in at least one audio stream, e.g. using G.711, G.719, G.7.222, Siren, G.729, Opus, AAC or Speex. In step 202 the at least one video stream and the at least one audio stream are transmitted in a media stream to a control unit 140 over a network. In step 203, the control unit 140, after receiving the at least one input media stream from at least one endpoint 120, 130, are searching for pointer events in the at least one input media stream. The search for pointer events may involve analyzing the at least video stream to find gestures using known technologies for gesture recognition in a video stream. The search for pointer events may also involve other technologies such as finding a light signal having a predetermined frequency and signaling pattern. The search for pointer events may also involve analyzing the at least one audio stream for predetermined audio signals using known audio recognition technologies. When a first pointer event is detected in the at least one input media stream, a first graphical item associated with the first pointer event is provided in step 204. In step 205, the first graphical item is encoded in an output media stream. Then in step 206, the output media stream is transmitted to the plurality of endpoints 120, 130. The output media stream is in step 207 received and displayed by the plurality of endpoints 120, 130. The step 203 of searching for pointer events in the at least one input media stream is continuously performed by the control unit 140. When the control unit 140 detects a second pointer event in the at least one input media stream, the control unit 140 performs an action associated with the second pointer event. The control unit 140 may continue to search for further pointer events in the at least one media stream. The term second pointer event is defined as a pointer event associated with a previous pointer event. As such, the second pointer event may comprise any number of associated pointer events in a chain.

When the first or second pointer event is detected in the at least one input media stream, the control unit 140 may, in step 208, provide a first audible item associated with the first or second pointer event. The first audible item is encoded in the output media stream, and transmitted to the at least one endpoint 120, 130.

The second pointer event may be detected before the output media stream has been encoded and transmitted to the plurality of endpoints 120, 130. Similarly, the action associated with the second pointer event may be performed before the output media stream has been encoded and transmitted to the plurality of endpoints 120, 130. Videoconferencing media streams are often optimized for low latency to provide the users with an experience of natural end-to-end communication. In example, detection of a gesture in a video stream takes about 1-2 ms. Video frames are encoded in the output media streams at a rate of 33 ms. Continuous detection of pointer events in the input media stream and display of the graphical elements on the endpoints create an immediate visual feedback to the user performing the pointer events. This creates a cognitive connection between the displayed graphical elements and the user, thus creating an intuitive user experience.

In one embodiment, the first graphical element associated with the first pointer event is a list of selectable items, such as a menu or the like. The list of selectable items will be encoded and transmitted to, and displayed on, the plurality of endpoints 120, 130. Alternatively, the control unit 140 may transmit the list of selectable items only to the endpoint 120, 130 that transmitted the input media stream in which the first pointer event was found. The control unit 140 may continue to transmit the list of selectable items until a second pointer event associated with the first pointer event is detected. The second pointer event may comprise performing an action associated with one of the selectable items. This may include providing a new list of selectable items, such as a sub-menu, drop down menu, etc. or selecting a parameter. In one embodiment, the action associated with one of the selectable items is to configure the control unit 140. In one exemplary embodiment, if a second pointer event associated with the first pointer event is not detected within a predetermined time, the control unit 140 stop to transmit the list of selectable items and start to search for a new first pointer event.

In an exemplary user scenario, a user may snap fingers, i.e. make a sound signal, to open a menu. The user may then wave the hand, i.e., make a gesture, to scroll the menu. The user may then snap multiple times, i.e. make a sound signal, to select a menu item. When a menu is presented or a menu item is selected, the control unit 140 may provide a first audible item, such as a ping, to provide an audible feedback to the user.

In another embodiment, the action associated with the second pointer event may be to provide annotation and comprise providing a second graphical element, encoding the second graphical element in the output media stream and transmitting the output media stream to the plurality of endpoints 120, 130. By continuously detecting annotation events, providing and encoding new graphical elements a smooth annotation experience may be achieved. The second graphical element may be a dot, alternatively, the second graphical element may comprise a line between the first pointer event and the second pointer event.

In another embodiment, the first graphical element associated with the first pointer is a 3D-model. The 3D-model may be created by any 3D computer graphics software. The 3D-model will be encoded and transmitted to, and displayed on, the plurality of endpoints. The action associated with the second pointer event comprises manipulating the 3D-model. Using gestures, the user may rotate the 3D-model, zoom in/out on the 3D-model, select parts of the 3D-model for closer inspections, draw or annotate on the 3D model etc. One exemplary pointer event comprises detecting two fingertips and their relative distance. Increasing or decreasing the distance may be used to zoom in or zoom out respectively. Rotating the fingers may be used rotate the 3D-model etc.

The control unit 140 may detect the first and second pointer events in input media streams from different endpoints. This may allow users at different sites to annotate or manipulate displayed graphical elements simultaneously.

In one embodiment, the control unit 140 may encode the first graphical element, and any subsequent graphical elements, in a data structure and store the data structure in the control unit 140. The graphical elements may be encoded according to an annotation object protocol. In a videoconference where the control unit 140 acts as a gateway, providing interoperability with a device or control unit using a different video conferencing technology, a data structure containing annotation objects may be exchanged over a data channel to provide annotation interoperability. A data structure containing annotation objects may also be imported into the control unit 140 and encoded in the output media stream in step 205.

The control unit 140 comprises at least one processor, at least one memory, input/output circuitry, a pointer event detection module, and a graphical item generator. The control unit 140 may also comprise an audible item generator.

Figure 3A:
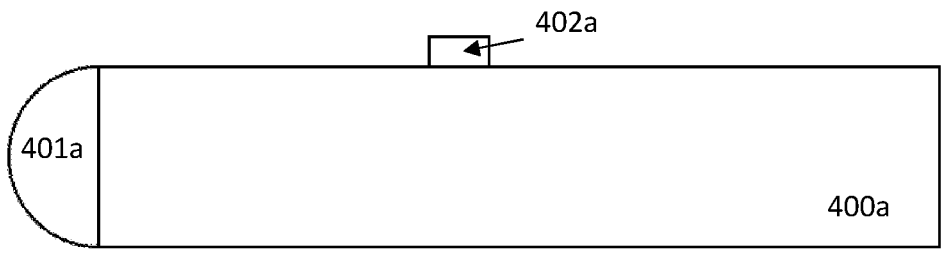
FIGS. 3a and 3b schematically illustrate an input device.
Figure 3B:
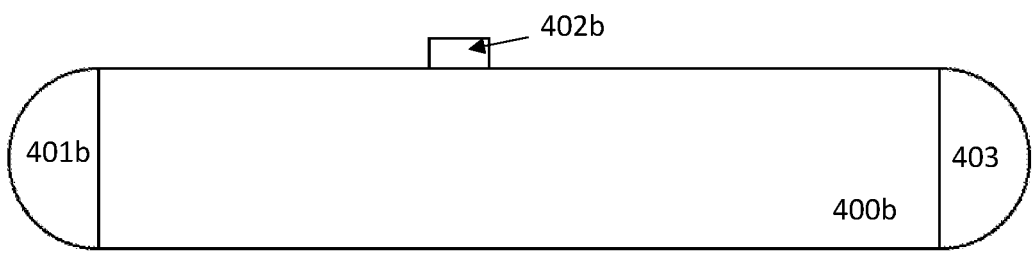

FIGS. 3a and 3b illustrate exemplary input devices 400a, 400b to the control unit 140. The input device comprises at least one light source 401a, 401b adapted to emit a light signal that, when received by the control unit 140 in at least one input video stream from at least one endpoint, is detected as a pointer event. The light source may emit light in the visual spectrum or in the infrared spectrum. The light source may further include a light switch 402a, 402b. Predetermined switching patterns may be associated with different pointer events. As illustrated in FIG. 4b, the light switch 400b further comprises a second light source 403. The input device 400b has two light sources at a fixed distance, thus the control unit 140 may easily detect rotation and forward/backward motion of the input device to control rotation and zoom.

In another example, there is provided a computer program comprising instructions which, when executed on at least one processor in a control unit according to the embodiments herein, cause the control unit to carry out the method according to the embodiments herein.

In a further example, a carrier comprises the computer program above. The carrier is one of an electronic signal, an optical signal, a radio signal and a computer readable storage medium and the like. In some examples, the carrier may exclude transitory, propagating signals, such as the electronic, optical and/or radio signal. Thus, in these examples, the computer program carrier may be a non-transitory carrier, such as a non-transitory computer readable storage medium.

As used herein, the term "computer readable storage medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable storage medium may be provided as one or more computer program products.

As used herein, the term "instructions" may refer to computer readable code units, which may be text of a computer program, parts of or an entire binary file representing a computer program in a compiled format or anything there between.

What is claimed is:
1. A method performed by a control unit in a video conferencing system during an ongoing video conference comprising a plurality of endpoints, the method comprising:
receiving at least one input media stream captured by a camera or a microphone from at least one endpoint, a user of the at least one endpoint performing an action being captured by at least one from the group consisting of the camera and the microphone:
detecting the action as a first pointer event in the at least one input media stream;

providing a first graphical item associated with the first pointer event;
encoding the first graphical item in an output media stream;
transmitting the output media stream to the at least one endpoint;
detecting a second pointer event in the at least one input media stream from the at least one endpoint; and
performing an action associated with the second pointer event, characterized by one of a group consisting of the first pointer event and the second pointer event including at least one of a group consisting of a light signal, a gesture, and a sound signal, where detecting pointer events includes searching for known pointer events by analyzing the at least one input media stream,
wherein the detecting is a continuous detecting to create an immediate visual feedback to the user performing the pointer event for the purpose of creating a cognitive connection between the displayed graphical elements and the user for an intuitive user experience.

2. The method of claim 1, wherein the first graphical item is a list of selectable items, and the action associated with the second pointer event includes performing an action associated with one of the selectable items.

3. The method of claim 2, wherein the action associated with one of the selectable items is to configure the control unit.

4. The method of claim 1, wherein the action associated with the second pointer event includes providing a second graphical element, encoding the second graphical element in the output media stream, and transmitting the output media stream to the plurality of endpoints.

5. The method of claim 4, wherein the second graphical element includes a line between the first pointer event and the second pointer event.

6. The method of claim 1, wherein the first graphical item is a 3D-model, and the action associated with the second pointer event includes manipulating the 3D-model.

7. The method of claim 1, wherein the first pointer event and the second pointer event are detected in a plurality of input media streams from different endpoints of the plurality of endpoints.

8. The method of claim 1, further comprising:
providing a first audible item associated with one of a group consisting of the first pointer event and the second pointer event;
encoding the first audible item in the output media stream; and
transmitting the output media stream to the at least one endpoint.

9. The method of claim 1, further comprising encoding the first graphical item in a data structure and storing the data structure in the control unit.

10. A control unit for a video conferencing system, the control unit comprising input/output circuitry, a processor and a memory, the memory containing instructions executable by said processor whereby the control unit is operative, during an ongoing video conference comprising a plurality of endpoints, to:
receive at least one input media stream captured by a camera or a microphone from at least one endpoint, a user of the at least one endpoint performing an action being captured by at least one from the group consisting of the camera and the microphone:
detect the action as a first pointer event in the at least one input media stream; provide a first graphical item associated with the first pointer event;
encode the first graphical item in an output media stream;
transmit the output media stream to the plurality of endpoints;
detect a second pointer event in the at least one input media stream; and
perform an action associated with the second pointer event, characterized by one of a group consisting of the first pointer event and the second pointer event including at least one of a group consisting of a light signal, a gesture and a sound signal, where detecting pointer events includes searching for known pointer events by analyzing the at least one input media stream,
wherein the detecting is a continuous detecting to create an immediate visual feedback to the user performing the pointer event for the purpose of creating a cognitive connection between the displayed graphical elements and the user for an intuitive user experience.

11. The control unit of claim 10, wherein the first graphical item is a list of selectable items, and the action associated with the second pointer event includes performing an action associated with one of the selectable items.

12. The control unit claim 11, wherein the action associated with one of the selectable items is to configure the control unit.

13. The control unit of claim 10, wherein the action associated with the second pointer event includes providing a second graphical element, encoding the second graphical element in the output media stream and transmitting the output media stream to the plurality of endpoints.

14. The control unit of claim 13, wherein the second graphical element includes a line between the first pointer event and the second pointer event.

15. The control unit of claim 10, wherein the first graphical item is a 3D-model, and the action associated with the second pointer event includes manipulating the 3D-model.

16. The control unit of claim 10, wherein the first and second pointer events are detected in input media streams from different endpoints of the plurality of endpoints.

17. The control unit of claim 10, wherein the control unit is further adapted to:
provide a first audible item associated with one of a group consisting of the first and second pointer event;
encode the first audible item in the output media stream; and
transmit the output media stream to the at least one endpoint.

18. The control unit of claim 10, wherein the control unit is further adapted to encode the first graphical item in a data structure and storing the data structure in the control unit.

19. A carrier having a non-transitory computer readable storage medium, including computer-executable instructions which, when executed on at least one processor in a control unit, cause the control unit to:
receive at least one input media stream captured by a camera or a microphone from at least one endpoint, a user of the at least one endpoint performing an action being captured by at least one from the group consisting of the camera and the microphone;
detect the action as a first pointer event in the at least one input media stream;
provide a first graphical item associated with the first pointer event;
encode the first graphical item in an output media stream;
transmit the output media stream to the at least one endpoint;
detect a second pointer event in the at least one input media stream from the at least one endpoint; and perform an action associated with the second pointer event, one of a group consisting of the first pointer event and the second pointer event including at least one of a group consisting of a light signal, a gesture, and a sound signal, where detecting pointer events includes searching for known pointer events by analyzing the at least one input media stream, wherein the detecting is a continuous detecting to create an immediate visual feedback to the user performing the pointer event for the purpose of creating a cognitive connection between the displayed graphical elements and the user for an intuitive user experience.

\* \* \* \* \*